United States Patent [19]

Sawahata et al.

[11] Patent Number: 6,055,369
[45] Date of Patent: Apr. 25, 2000

[54] APPARATUS FOR VISUAL PROGRAMMING WITH SCREEN FLOW

[75] Inventors: Tomoharu Sawahata, Yokohama, Japan; Wei-Tek Tsai, Minneapolis, Minn.; Akira K. Onoma, Yokohama, Japan; Tao Jiang, Minneapolis, Minn.

[73] Assignees: Hitachi Software Engineering Co., Ltd., Kanagawa-ken, Japan; Regents of the University of Minnesota, Minneapolis, Minn.

[21] Appl. No.: 08/852,033

[22] Filed: May 6, 1997

[51] Int. Cl.[7] .................................................. G06F 9/445
[52] U.S. Cl. .................................................. 395/702
[58] Field of Search ................................... 395/342, 157, 395/500, 700, 702; 345/302, 326, 333

[56] References Cited

U.S. PATENT DOCUMENTS

| | | | |
|---|---|---|---|
| 5,287,514 | 2/1994 | Gram | 395/700 |
| 5,297,250 | 3/1994 | Leroy et al. | 395/157 |
| 5,664,129 | 9/1997 | Futatsugi | 345/339 |
| 5,689,665 | 11/1997 | Mitsui et al. | 395/342 |

*Primary Examiner*—Tariq R. Hafiz
*Assistant Examiner*—Chameli Chaudhuri Das
*Attorney, Agent, or Firm*—Beall Law Offices

[57] ABSTRACT

An apparatus is disclosed for visual programming for creating a program with a visual user interface. The visual programming apparatus has a screen storage unit for storing multiple screens to be employed with the program; a screen creating unit for creating the multiple screens to be employed with the program and storing the multiple screens in the screen storage unit; a screen flow creating unit for creating a screen flow indicating a flow of processes by displaying on an edit screen the multiple screens stored in the screen storage unit in a compressed manner and specifying a link between the multiple compressed screens on the edit screen; a screen flow information extracting unit for extracting data of a link from the screen flow created by the screen flow creating unit; and a code creating unit for creating a source code from the data of the link extracted by the screen flow information extracting unit and from data of the screen.

10 Claims, 11 Drawing Sheets

FIG. 2

| BELONGING SCREEN NODE IDENTIFIER | FLOW START NODE IDENTIFIER | FILE NAME FOR CODE CORRES. TO EACH SCREEN | FUNCTION NAME CORRES. TO EACH PROGRAM PART | CONNECTED NODE IDENTIFIER |
|---|---|---|---|---|
| 0 | 46 | Start.cpp | | 43a |
| 43a | A | Start.cpp | BUTTON_A_CLICK | 43b |
| 43a | B | Start.cpp | BUTTON_B_CLICK | 43c |
| 43a | C | Start.cpp | MENU_C_CLICK | 49 |
| 43a | 49 | Start.cpp | MENU_C_CLICK | 43d |

FIG. 10A

| BELONGING SCREEN NODE IDENTIFIER | FLOW START NODE IDENTIFIER | FILE NAME FOR CODE CORRES. TO EACH SCREEN | FUNCTION NAME CORRES. TO EACH PROGRAM PART | CONNECTED NODE IDENTIFIER |
|---|---|---|---|---|
| 701 | 702 | SCRA. CPP | BUTTON_A_CLICK | 704 |
| 701 | 703 | SCRA. CPP | BUTTON_B_CLICK | 705 |
| 705 | 706 | SCRE. CPP | BUTTON_C_CLICK | 708 |
| 705 | 708 | SCRE. CPP | BUTTON_C_CLICK | 710 |
| 705 | 707 | SCRE. CPP | BUTTON_D_CLICK | 709 |
| 710 | 712 | SCRJ. CPP | BUTTON_E_CLICK | 715 |
| 710 | 715 | SCRJ. CPP | BUTTON_E_CLICK | 716 |
| 710 | 713 | SCRJ. CPP | BUTTON_F_CLICK | 714 |

FIG. 10B

| BELONGING SCREEN NODE IDENTIFIER (21) | FLOW START NODE IDENTIFIER (22) | FILE NAME FOR CODE CORRES. TO EACH SCREEN (23) | FUNCTION NAME CORRES. TO EACH PROGRAM PART (24) | CONNECTED NODE IDENTIFIER (25) |
|---|---|---|---|---|
| 721 | 723 | SCR2A. CPP | BUTTON_X_CLICK | 725 |
| 726 | 728 | SCR2F. CPP | BUTTON_E_CLICK | 730 |
| 726 | 730 | SCR2F. CPP | BUTTON_E_CLICK | 733 |
| 726 | 729 | SCR2F. CPP | BUTTON_F_CLICK | 731 |
| 721 | 724 | SCR2A. CPP | BUTTON_Y_CLICK | 726 |

140, 132, 133

APPARATUS FOR VISUAL PROGRAMMING WITH SCREEN FLOW

BACKGROUND OF THE INVENTION

1. Field of the Invention

The present invention relates to an apparatus for visual programming with screen flow to design, create and inspect a program having a visual user interface with a flow chart referred to as a screen flow.

2. Description of the Related Art

Until now, there have been provided development tools for programs having a visual user interface for programs as developed by Visual C++, Visual Basic or the like.

When a program is developed with such a development tool, a method for creating an application program with a visual user interface (hereinafter referred to as a "visual program") by a development support tool comprises first constructing one screen by creating program parts such as buttons individually on the screen and combining the created program parts, and then linking the program parts constructing the screen to each other, thereby characterizing each of the program parts individually, and finally completing the program. In other words, a visual program is developed by a method (bottom-up) of piling up parts from the bottom.

A programmer creating such a visual program first creates a screen acting as a base and then describes code for each of the program parts on the screen acting as the base.

Application programs generally have multiple user interfaces and multiple user interface screens in many cases. In order to develop a program, many screens need to be created so that a programmer repeats the same processes for creating each screen in order to create the multiple screens. In other words, the procedure of the processes for constructing the screen by first creating the screen and then connecting codes to the screen must be repeated. These processes are cumbersome and programmers may easily lose the motivation to work for creating other screens even after having created a few screens.

Further, relationships between each of those multiple screens created in the manner as described hereinabove should be explicitly described by the program code. For example, even where the relationship is attempted to change in a simple visual program where, when a button B of a screen 1 is clicked by a mouse button, a screen 2 is generated and, when a button D of the screen 2 is clicked, a screen 3 is generated, it is not easy to change the relationship between any two screens because the corresponding codes should also be changed.

As described hereinabove, it is difficult to see the link between the screens in a visual program having multiple screens at the time of creating-the program. Thus, it is desired that the relationships between each of the multiple screens be described separately as a flow of processes upon creating the visual program having multiple screens; however, a programmer must understand the flow by a specification of the program.

Further, the conventional work to write a program code for generating a certain screen from other screens should be manually carried out one by one. If a wrong screen identifier were to be written in error, the problem may be caused to occur that a different screen is generated. In addition, when the visual program created is inspected, the inspection is usually carried out by comparing it with the specification of the program. Each code must be visually inspected without such a specification.

A conventional way of creating the visual program suffers from the disadvantage that it is difficult to understand the association of the screens with each other. Further, even if a specification relating to the linking of the screens is created, work to create program codes from the specification should be done manually so that errors may be likely to occur during manual work.

Furthermore, where the visual program created is to be inspected, the development of each screen should be compared with a specification without screen flow by manual work or an actual program is tested without any such specification. Hence, errors may be likely to occur.

SUMMARY OF THE INVENTION

It is an object of the present invention to provide an apparatus for visual programming with screen flow capable of readily designing, creating and inspecting a visual program using screen flow.

It is another object of the present invention to provide an apparatus for visual programming with screen flow to use screen flow to be employed in designing for creating and inspecting a visual program, as to reduce errors at the time of creating the program codes, and as to work as a tool for automating a part thereof, when the visual program is created.

In order to achieve the objects as described hereinabove, the present invention provides an apparatus for visual programming for creating a visual program, which comprises screen storage means (4) for storing multiple screens to be employed with the program; screen generating means (1) for generating multiple screens to be employed with the program and storing the multiple screens in the screen storage means; screen flow creating means (2) for creating a screen flow indicating a flow of processes by displaying on an edit screen the multiple screens stored in the screen storage means in a compressed manner and specifying a link between the multiple compressed screens and node elements on the edit screen; screen flow information extracting means (3) for extracting data on the link from the screen flow created by the screen flow creating means; and code creating means (5) for creating a source code from the data of the link extracted by the screen flow information extracting means and from data of the screen.

The visual programming apparatus according to the present invention is further provided with execution means (7) for displaying the screen flow created by the screen flow creating means on the edit screen, executing the source code created by the code creating means, for example, by creating execution files, and displaying a course of executing processes at a position corresponding to the screen flow on the edit screen, in addition to the features of the configuration as described hereinabove.

The screen flow creating means is further provided with a screen flow control table for registering a flow of processes between screens starting with the program part such as buttons or the like in the multiple screens to be used with the visual program, wherein the multiple screens are linked to each other in the screen flow control table.

When a visual program is created in the visual programming apparatus having a variety of the features as described hereinabove, the multiple screens to be employed in the visual program are first created. They are compressed in a smaller size and displayed on the edit screen. Then, the links between the compressed screens are specified, thereby creating a screen flow indicating a flow of processes.

Once the screen flow is created, program codes of the processes by the links between the screens are created using the screen flow, thereby permitting the designing of a whole program and creating of the visual program. Further, the visual program created can also be inspected by following a flow of the processes sequentially using the screen flow. This allows a consistent course of the processes for designing, creating and inspecting the visual program using the screen flow, thereby enabling the development of the programs in an efficient way. Furthermore, a program code for a part of the program part can be constructed to be automatically created from the screen flow.

Other objects, features and advantages of the present invention will become apparent in the course of the following description with reference to the accompanying drawings.

BRIEF DESCRIPTION OF THE DRAWINGS

FIG. 2 shows a screen flow control table.

FIGS. 10A and 10B are views showing a part of a screen flow control table corresponding to the screen flow for edit screens 70 and 72 as shown in FIG. 7, respectively.

DETAILED DESCRIPTION OF THE PREFERRED EMBODIMENTS

The present invention will be described in more detail by way of examples with reference to the accompanying drawings.

Figure 1:
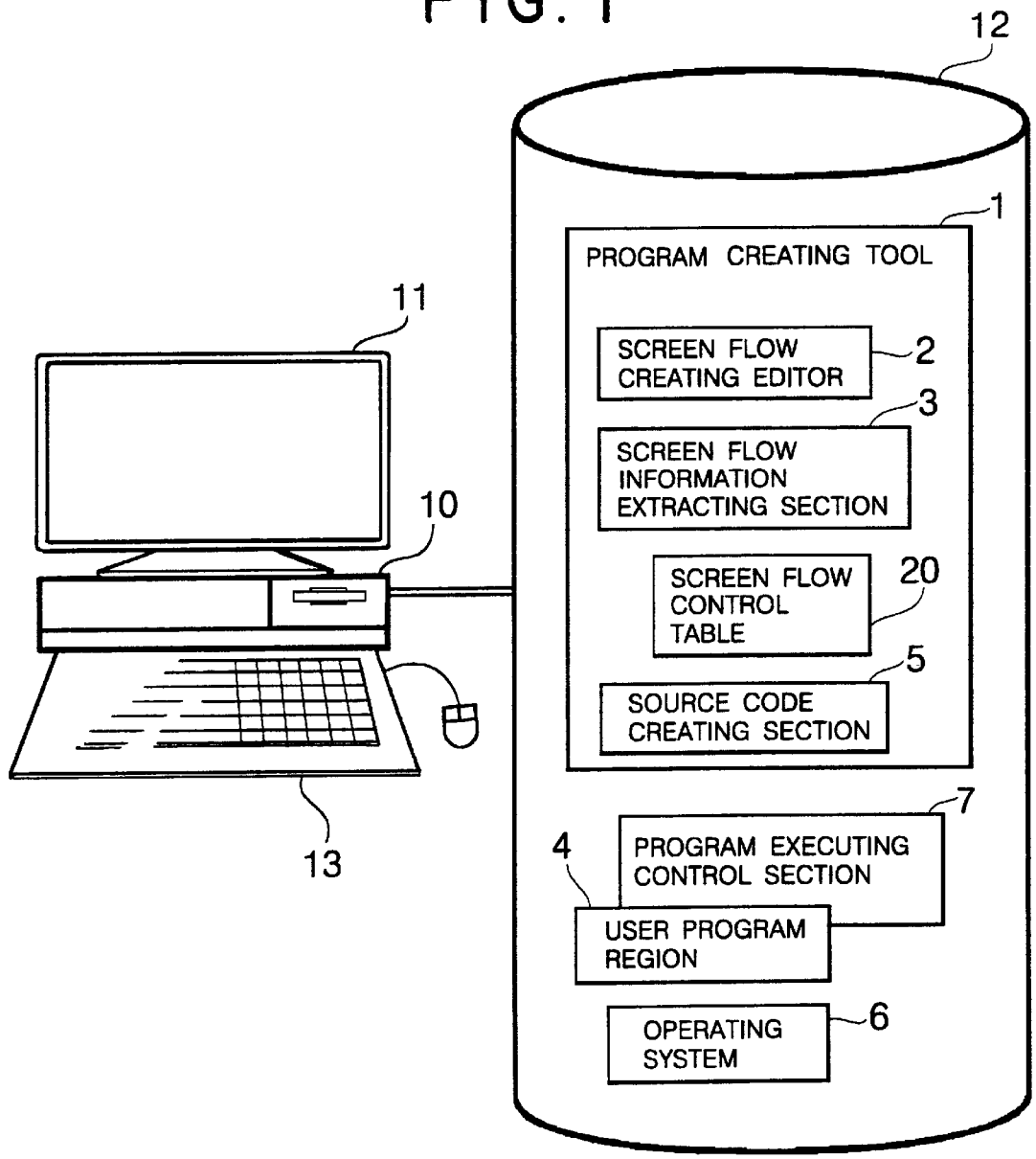
FIG. 1 is a view showing the fundamental portion of the structure of an apparatus for visual programming with screen flow according to an embodiment of the present invention.

FIG. 1 shows the fundamental portion of the structure of the apparatus for visual programming with screen flow according to an embodiment of the present invention. As shown in FIG. 1, reference numeral 1 denotes a program creating tool, reference numeral 2 a screen flow creating editor for creating screen flow, reference numeral 3 a screen flow information extracting section for extracting information on screen flow, reference numeral 4 a user program region for storing screens and so on to be employed in a visual program, reference numeral 5 a source code creating section for creating a source code for a visual program, reference numeral 6 a system control section for an operating system and so on for controlling the system, reference numeral 7 is a program execution control section for controlling the execution and termination of a visual program, reference numeral 10 a computer system device, reference numeral 11 a display unit, reference numeral 12 an external storage such as a hard disk unit, reference numeral 13 an input device such as a keyboard, and reference numeral 20 denotes a screen flow control table for storing screen flow, the table having a data configuration described with respect to detail in FIG. 2.

As shown in FIG. 1, the visual programming apparatus according to the present invention has a hardware configuration in which the display unit 11, the external storage 12 and the input device 13 are connected to the computer system device 10, and has a software configuration comprising the program creating tool 1, the source code creating section 5 and the system control section 6 consisting of the operating system and so on. The program creating tool 1 contains at least the screen flow creating editor 2, the screen flow information extracting section 3, and the screen flow control table 20. In addition, although not shown, there may be provided a screen creating tool such as a text editor, an image editor, a picture editor and so on for creating a screen and so on to be employed with the visual program. For the software configuration, memory regions of the external storage 12 are assigned where the respective software is installed. At the time of the operation for creating the visual program, software elements necessary for the action thereof are retrieved into a memory unit incorporated into the computer system device 10, and a control processing unit (CPU) in the computer system device 10 executes data processing on the basis of the program of each of the software elements and the contents of data in accordance with the control by the system control section 6 for the operating system and so on. The system control section 6 for the operating system and so on opens multiple edit window screens and provides the action environment for a graphical user interface in order to secure a ready input operation by operators.

When a visual program is to be created by the visual programming apparatus having the configuration as described hereinabove, the user program region 4 is first located in order to store multiple screens to be employed with the visual program. Thereafter, the program creating tool 1 is activated to create multiple screens to be employed with the visual program using the screen creating tools such as the editors. The multiple screens to be employed with the program to be created are stored in the user program region 4.

The screen flow creating editor 2 to be provided in the program creating tool 1 compresses the previously created multiple screens stored in the user program region 4 and displays the compressed screens on the edit window screen. The links among the multiple compressed screens displayed on the edit window screen are then displayed after addition of a node element for controlling the process, thereby creating a screen flow indicating a flow of the processes of the visual program.

The screen flow information extracting section 3 for extracting the information on the screen flow extracts data of the links from the screen flow created by the screen flow creating editor 2 and stores the data of the links extracted therefrom as data of the screen flow control table 20.

The source code creating section 5 creates a source code for the program in the user program region 4 from the link data extracted by the screen flow information extracting section 3 and the data of the multiple screens to be used for the program, thereby completing the visual program. Further, the source code creating section 5 can create and generate an execution program or the like directly when it is configured to contain a compiler or the like.

The program execution control section 7 executes the program by reading the execution programs or the like created from the source code creating section 5 one after another. At this time, in order to confirm the program process flow, a window screen for debugging the program is opened and the screen flow corresponding to the program created is displayed on the window screen. Then, the execution program is executed, displaying the course of executing processes in the position corresponding to the screen flow on the window screen.

Now, a description will be made of a specific example. At the stage when a specification of demands by users for a visual program to be created has been decided, all screens required for such a visual program are designed and created in accordance with the specification. Even if there would still be something left unestablished, a frame of the screen acting as a base to be employed with the visual program is designed and created. Information on each screen created at the time of designing the screens is managed by the screen flow control table 20 (FIG. 2) and a main body of the information on the screens is stored in a screen information store region provided separately.

FIG. 2 shows the data configuration of the screen flow control table. As shown in FIG. 2, the screen flow control table 20 comprises a belonging screen node identifier field 21, a flow start node identifier field 22, a file name field 23 for a code corresponding to each screen, a function name field 24 corresponding to each program part, and a connected node identifier field 25.

Next, a description will be made of the identifiers and so on assigned for each node on the screen flow in the screen flow control table 20, in order to control the data of the screen flow. The screen nodes on the screen flow and the nodes relating to the program parts and the program process, such as a start node, end node, exit node, process node and branch node, are provided with unique identifiers and the identifiers are referred to herein as node identifiers. The program part in each of the screen nodes belongs to the corresponding screen node and each of the nodes relating to the program process nodes, except for the start node, belongs to the screen node on the side closest to the program process node and acting as the start point of the process. An instruction concerning the relationships of these connections is given after the node identifier of the corresponding screen node has been stored in the belonging screen node identifier field 21, provided that an identifier is only provided for the start node (for example, such as "0"), which identifies cannot be used as a node identifier, because it has no belonging screen node.

Each node element of the screen flow is registered as one record of the screen flow control table for each node with two links on the screen flow, and more specifically, as one line of the screen flow control table in FIG. 2. The node of the two-linked node located on the side of the start point is referred to as a flow start node and the node located on the side of the end point is referred to as a connected node that is stored in the connected node identifier field 25. The file name field 23 is stored with a file name describing the code corresponding to each of the screens. The function name field 24 is stored with the name of a function corresponding to each event such as a click of the program part in each screen node by the mouse button.

As the screen flow of the visual program has been created by linking the screen nodes to each other with the screen flow creating editor 2, information on the links between the nodes on the screen flow are extracted and stored in the screen flow control table 20. On the basis of the information of the screen flow control table 20 corresponding to the screen flow, a portion of the program code can be automatically created and the progress of the screens of the program can be inspected.

Figure 3:
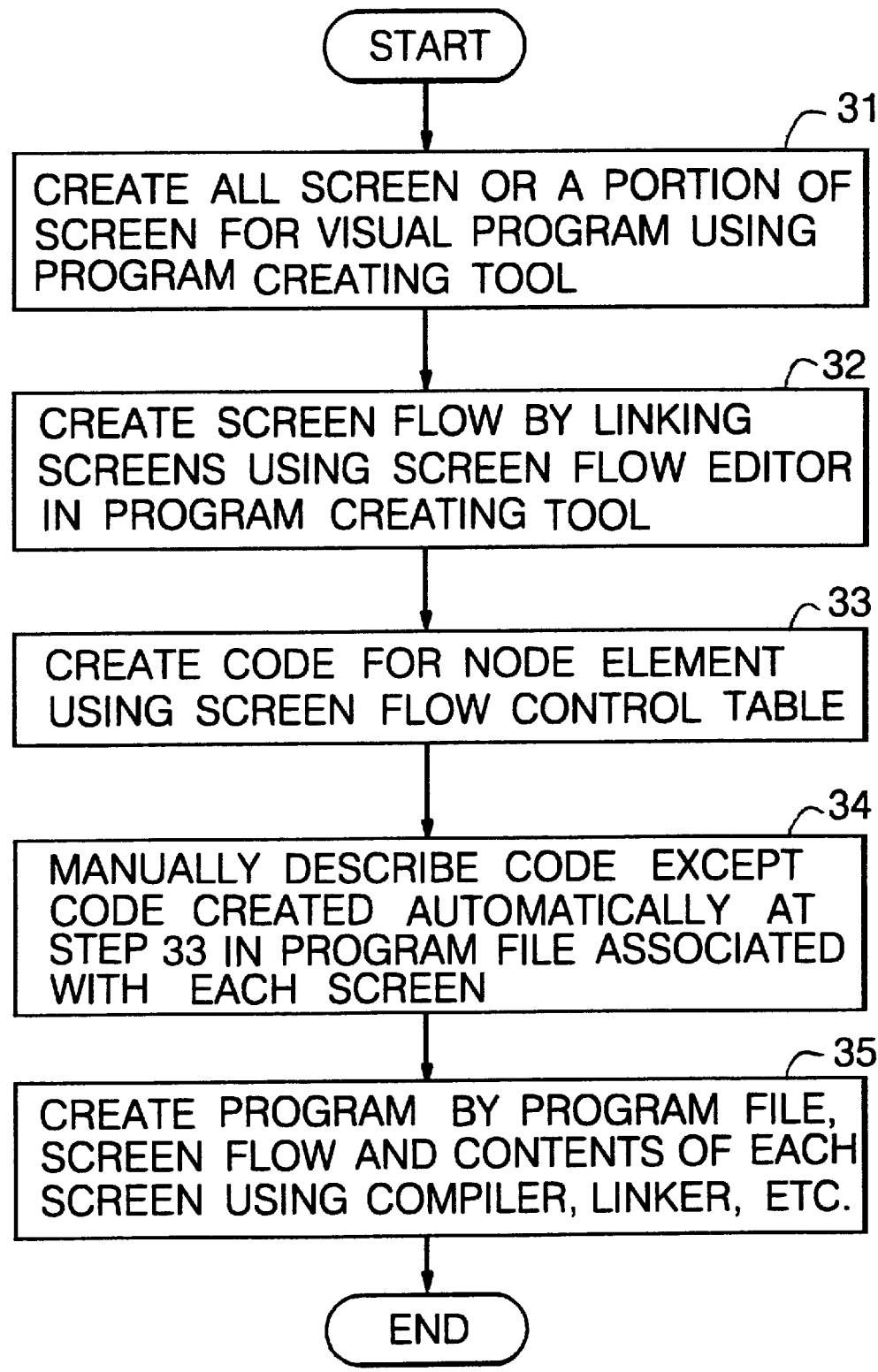
FIG. 3 is a flow chart showing a flow of the entire processes for creating a visual program by the visual programming apparatus according to an embodiment of the present invention.

FIG. 3 is a flow chart describing the course of the processes for creating the visual program by the visual programming apparatus according to an embodiment of the present invention. A description will be made with reference to FIG. 3.

As the process starts, first, at step 31, all screens to be used for the visual program or, even if a portion would not be created yet, a frame of the screen acting as a base to be employed with the visual program are or is created by means of the screen creating editor of the program creating tool.

Then, at step 32, the links between the multiple screens created are specified together with the processes between each screen, and the screen flow is created using the screen flow creating editor in the program creating tools.

At step 33, the source code relating to the display of the screen and the node element indicating the control of each process on the screen flow are automatically created using the screen flow control table corresponding to the screen flow created.

Then, at step 34, program codes except for ones created automatically at step 33 are manually described in the program file associated with each screen.

Thereafter, at step 35, a final executable visual program is completed using a compiler, and linker or the like, on the basis of the program file so far created, the screen flow, the corresponding screen flow control table, and the contents of each screen to be employed with the visual program.

Now, a description will be made of a specific example for creating a visual program by the visual programming apparatus according to the present invention, together with a specific operation example.

Figure 4:
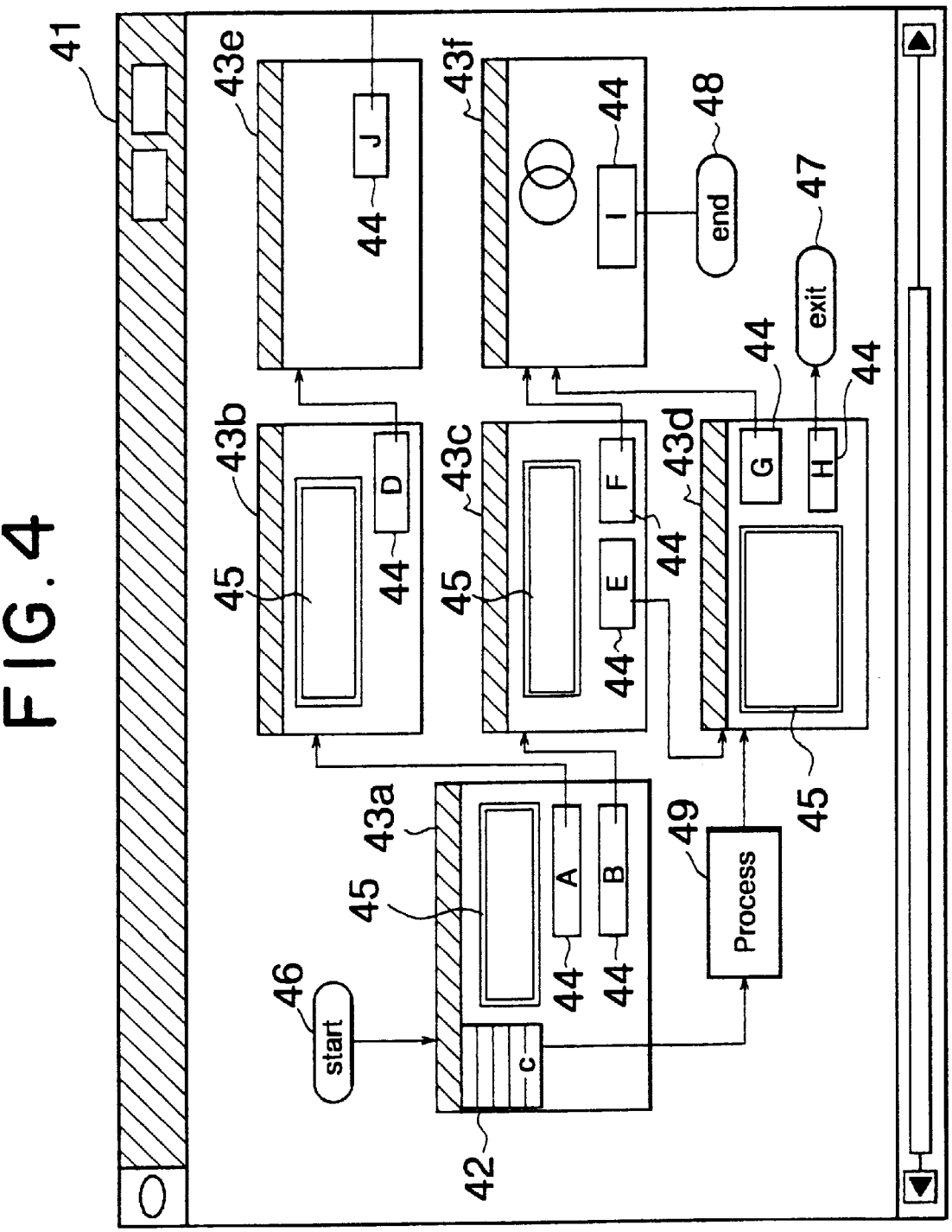
FIG. 4 is a view showing an example of window screens of a screen flow creating editor in a program creating tool.

FIG. 4 shows an example of the window screen of the screen flow creating editor in the program creating tools. In FIG. 4, reference numeral 41 denotes an edit window screen for the screen flow creating editor in the program creating tools; reference numeral 42 a node element (a menu node) indicating a menu to be employed with a user program; reference numerals 43a to 43f each a screen element (a screen node) for displaying a compressed screen to be employed with the user program; reference numeral 44 a node element (a button node) indicating a button to be employed in the screen of the visual program; reference numeral 45 an information display field to be employed in the screen of the visual program; reference numeral 46 a node element (a start node) indicating the start of the program; reference numeral 47 a node element (an exit node) indicating the termination of the program; reference numeral 48 a node element (an end node) indicating the disappearance of the screen; and reference numeral 49 a node element (a process node, a branch node or the like) indicating the control of the processes except for the output of the screen.

As described hereinabove, at the stage where the specification of program requirements for the visual program to be created has been established, all screens necessary for the visual program to be created or a frame of the screen acting as the base to be used for the visual program to be created, even if a portion of the specification for the visual program would be left yet established, are or is created by means of the screen flow creating editor 2 in the program creating tool 1 (at step 31).

Then, as the screen flow creating editor 2 in the program creating tool 1 is activated, the edit window screen 41 is opened and the screens to be employed with the visual program previously created are displayed each in a compressed size as screen nodes 43a–43f, respectively. In the screen nodes 43a–43f of the screens displayed in compressed manner, there are further displayed the button node 44 indicating the button to be employed in the screen of the visual program, the menu node 42 indicating the menu to be employed with the visual program, and the information display field 45 to be employed in the screen of the visual program, while holding the relationships of their positions as they are in the screens previously created.

A programmer then provides the relationships among the multiple screen nodes 43a–43f displayed in the edit window screen 41 by means of the screen flow creating editor 2, thereby creating a screen flow. In this case, the node element (the start node) 46 indicating the start of the program process is first selected out of the edit tool menu of the screen flow creating editor 2 and pasted to the screen node 43a of the screen to be first displayed at an appropriate position in the edit window screen 41, thereby making a link to the starting screen. This concludes the first screen on the screen flow, which is to be displayed at the time of the start of the program.

Next, a link is constructed from the menu node 42 to the process node 49 by pasting the process node 49 for the process to be implemented by the event, such as the click of the mouse button or the like, to the menu node 42 of the program part in the first screen node 43a on the screen flow. Thereafter, a link is made from the process node to the screen node 43d of the screen to be displayed after the implementation of the process. Further, a link is made from the button nodes (Button A, Button B) in the screen node 43a to the screen nodes 43b and 43c for the next screens to be displayed by the event such as the click of the buttons. These links provide the relationships of the screen node 43a with the screen nodes 43b and 43c. Likewise, links are made between the screen nodes, the process nodes and so on, as needed. Thereafter, the screen flow is created by pasting the exit node 47 indicating the control of the process for terminating the process on the screen flow or the end node 48 indicating the control of the process for disappearing the screen, thereby forming links to the program parts of the appropriate screens (at step 32).

A specific example for implementing operations will be described hereinafter. The operations are implemented in the edit window screen 41 simply by selecting the screen nodes including the button nodes and the menu nodes, the start node, the end node, the process nodes relating to the node elements indicating the control of each process on the screen flow, the branch nodes and so on, and pasting them, thereby making links among them. These operations are substantially the same as operations for creating a picture by means of a conventional graphical user interface. The relationships between the nodes are indicated by the lines (arrows) representing the direction, thereby indicating the relationships between the links.

As the multiple screens to be employed with the visual program previously created by the screen flow are linked to the program parts to be created provided in the screens by means of the screen flow created in the manner as described hereinabove, the information on the links is extracted and controlled using the screen flow control table 20 (FIG. 2).

For example, when the screen flow is created in the manner as shown in FIG. 4, information about the links is stored in the screen flow control table 20 as shown in FIG. 2. As the screen nodes on the screen flow and the nodes pertaining to the program parts and the program processing, such as the start node, the end node, the exit node, the process nodes, the branch node and so on, are provided with the node identifiers that are unique, these node identifiers are stored in the screen flow control table 20 as shown in FIG. 2 and they are,controlled by identifying each node therewith.

Further, the program parts in each screen node belong to the corresponding screen node, and each of the nodes pertaining to the program processes except for the start node belong to the screen node on the side closest to the node for the involved program process and acting as the starting point of the process of the program. Furthermore, as the node identifier of the belonging screen node is stored in the belonging screen node identifier field 21, the process node 49 belongs to the screen node 43a as shown in FIG. 4. This is registered as a record in the fifth line in the screen flow control table as shown in FIG. 2.

The start node 46 is registered as a record in the first line in the screen flow control table as shown in FIG. 2. As the start node 46 has no screen node to which it belongs, numeral "0" (which cannot be employed as a node identifier) is stored in the belonging screen node identifier field 21.

A description is made of the screen, flow control table as shown in FIG. 2 in which the screen number in FIG. 4 is used as the node identifier. In order to distinguish the buttons from each other, however, the names of the buttons are employed as node identifiers for the buttons. The start node of the node identifier 46 is linked to the screen of the node identifier 43a, thus indicating that this screen is the starting screen for the program as the program is activated. As the start node 46 has no screen node to which it belongs, although described previously, the belonging screen node identifier field 21 is stored with numeral "0", (which cannot be employed as a node identifier.

As the code that is to be processed at the time of clicking Button A (the flow start node identifier field 22) in the screen node of the node identifier 43a (the belonging screen node identifier field 21) by the mouse button is stored in a function (the function name field 24 corresponding to each program part) indicated by BUTTON__A__CLICK of a file (the file name field 23 for the code corresponding to each screen) indicated by file name "start.cpp", the screen to be generated by the event of clicking the Button A by the mouse button is registered in the screen flow control table 20 to become a screen of the node identifier 43b.

As the screen flow is registered for each node with two links on the screen flow as one record of the screen flow control table (as one line of the table as shown in FIG. 2) in the manner as described hereinabove, the flow start node of the two-linked node on the side of the starting point is stored in the flow start node field 22 and the connection node of the two-linked node on the side of the terminating point is stored in the connection node identifier field 25.

Likewise, the code to be processed at the time of clicking Button B in the screen of the node identifier 43a by the mouse button is stored in the function defined as BUTTON__B__CLICK in the file having the file name "start.cpp". The screen to be generated by performing the action of the Button B is registered in the screen flow control table as indicating that it is the screen of the node identifier 43c.

In addition, the code relating to Menu C (the node identifier C) in the screen of the node identifier 43a is likewise stored in the function referred to as MENU__C__CLICK of the file having the file name as "start.cpp". When the Menu C is clicked, the process node "PROCESS 1" of the node identifier 49 is executed. Therefore, as the flow start node is the Menu C, and the node identifier C therefore is stored in the flow start node field 22 and the node identifier 49 is stored in the connection node identifier field 25 because the connection node is PROCESS 1 having the node identifier 49. Thereafter, the process node "PROCESS 1" is further connected to the screen node with the node identifier 43d. In other words, this means that the screen of the node identifier 43d is displayed after the process node "PROCESS 1" has been executed. Accordingly, the flow start node identifier for the next record of the screen flow control table 20 is registered as "49" and the file name for the code is registered as "start.cpp". Furthermore, the name of the corresponding function is registered as "MENU_C_CLICK", like the process node "PROCESS 1".

At the next stage, the codes for generating the screens and the codes relating to the end code, the exit code, the process codes, the branch codes and other codes on the screen flow are automatically created using the program creating tool. Upon receipt of an instruction to generate the code automatically, the program creating tool automatically inserts the codes pertaining to the involved process into the appropriate function of the file for the involved code in the case where the screen nodes, the end node, the exit node, the process nodes, the branch nodes or the like are located in the connection node identifier field 25 of the screen flow control table 20 (at step 33). Thereafter, the codes except for the automatically inserted codes are manually written similarly in a conventional manner, thereby completing the program codes (at step 34). Finally, the program is then completed by linking these codes to each other via compilers, linkers and so on (at step 35).

The visual program so created can be inspected in a manner as will be described hereinafter on the basis of the screen flow of the visual program created therein. In other words, in order to inspect the visual program, the program creating tool is activated together with a debugger and the screen flow corresponding to the visual program to be inspected is displayed, followed by activating the program execution control section 7 that is part of the debugger and proceeding with the processes by executing the steps of the visual program to display the positions of the node identifiers of the process nodes corresponding to the screen flow. Then, it is confirmed by visually inspecting whether the visual program runs correctly, and the screens are developed as required by the specification.

As described hereinabove, the visual programming apparatus with screen flow according to this embodiment of the present invention can save laborious work for transferring the screen for designing the visual program to the screen of the program, thus avoiding errors that may otherwise be caused to occur upon the transfer of the screen. Further, a part of the creation of the program can be automated at the time of designing using the screen flow technique. In addition, errors that may otherwise occur at the time of inspection can also be reduced by using the screen flow method for inspection of the program.

Figure 5:
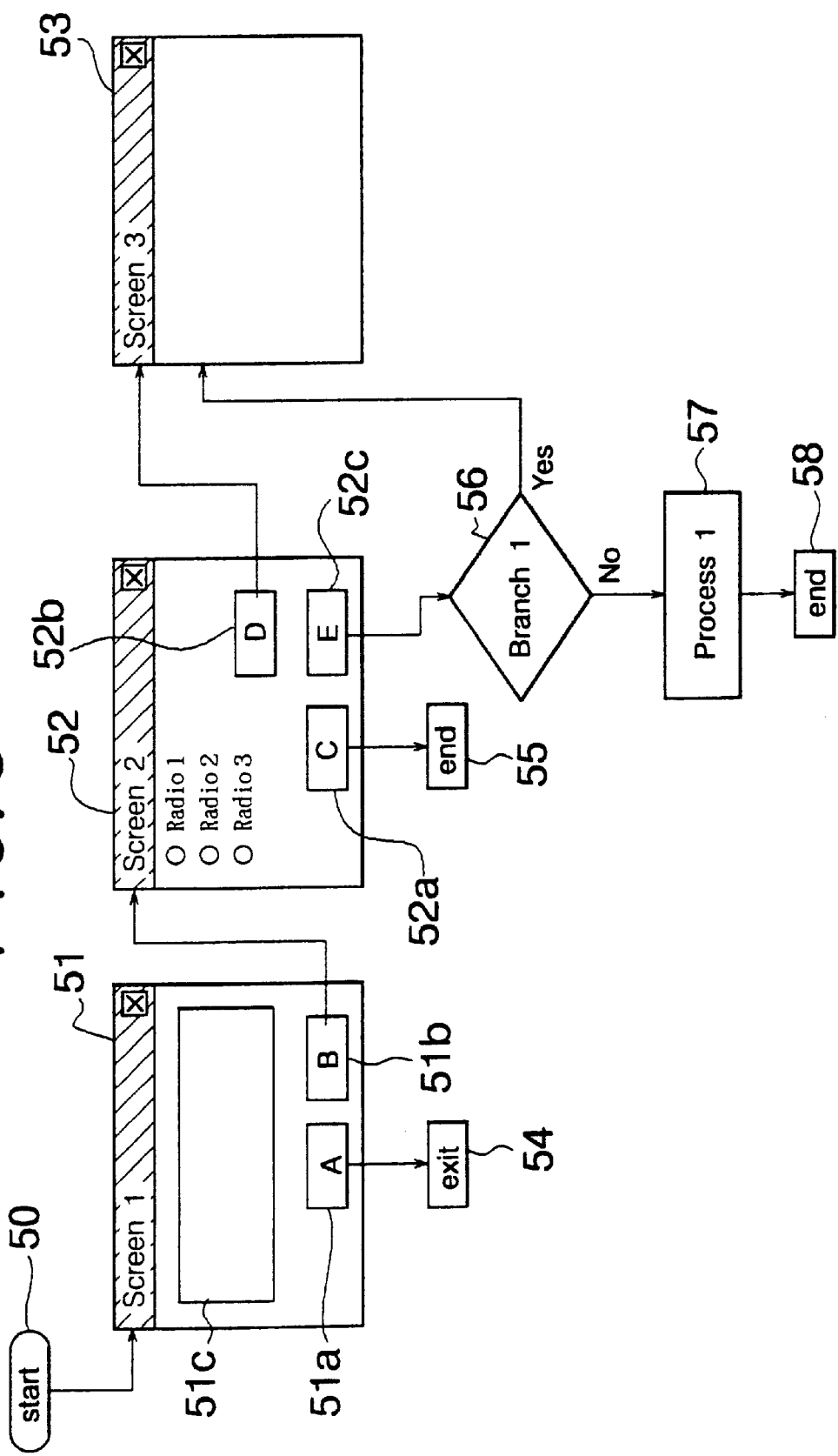
FIG. 5 is a view showing an example of operations for a method for the development of a program using screen flow.

A programmer first creates all screens necessary to be employed for the visual program. For example, as shown in FIG. 5, there are created three screens 51, 52 and 53. To the screen 51 are pasted program parts consisting of Button A 51a, Button B 51b and an information display field 51c. The screen 52 is likewise pasted with program parts consisting of Button C 52a, Button D 52b, Button E 52c and three radio buttons (Radio 1, Radio 2, and Radio 3). In the screen 53, only a frame of the screen is created without creating any program parts to be pasted thereto.

Next, the screen flow creating editor is activated and the three screens are displayed on the edit window screen. Upon display of the edit window screen, each of the three screens is displayed thereon in a compressed manner and they are displayed as screen nodes (screen 51, screen 52, and screen 53) including the button nodes corresponding to the respective buttons of the program parts. The relationships between the screen nodes are pasted, as needed, together with node elements indicating the control of other processes (start node, process nodes, branch node, end node, exit node, and so on). An instruction (an operation to connect the nodes to each other by the arrow) is then given to connect the screen nodes to the button nodes contained therein, together with the relationships between these node elements, thereby creating the screen flow as shown in FIG. 5.

On the screen flow as shown in FIG. 5, the start node 50 is provided and linked to the screen node 51, thereby permitting an instruction to be given to display the screen node at the time of the start of the program. Further, the button node of the Button A 51a of the screen node 51 is linked to an exit node 54, and an instruction to terminate the entire program is given by clicking the Button A 51a in the screen node 51. The button node of the Button B 51b of the screen node 51 is linked to the screen node 52 and an instruction to display the screen node 52 is given by clicking the Button B 51b of the screen 51. The relationships of the links between these nodes are registered in the screen flow control table 20 as described hereinabove. In other words, the screen flow and the screen flow control table 20 are associated with each other in a one-to-one manner.

Figure 6B:
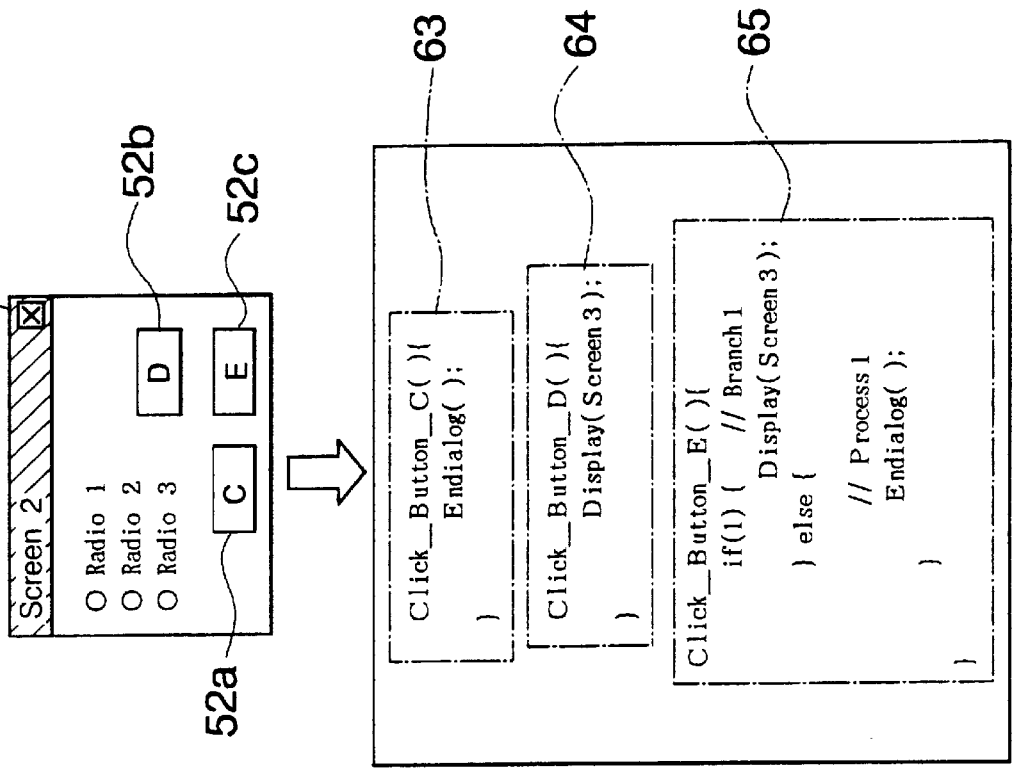
FIGS. 6A and 6B are views showing a way of automatically creating program codes.
Figure 6A:
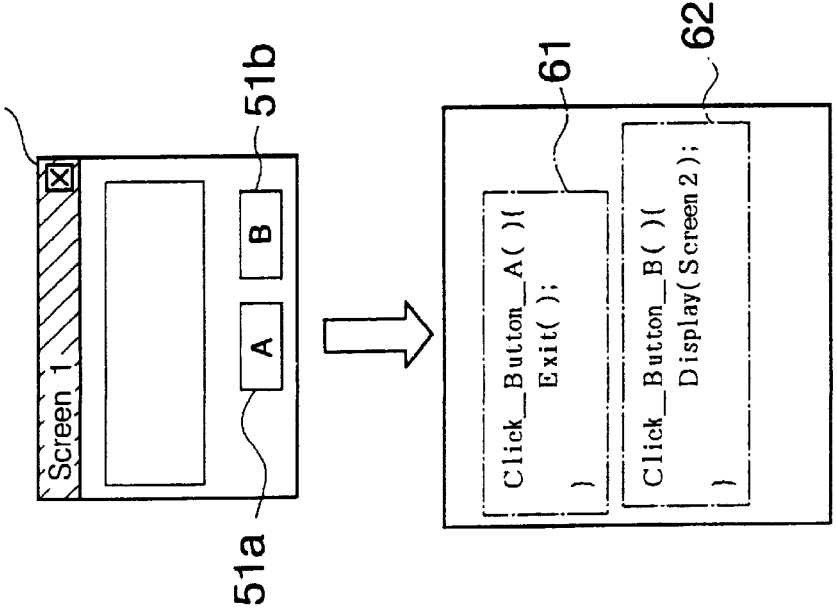
Figure 9:
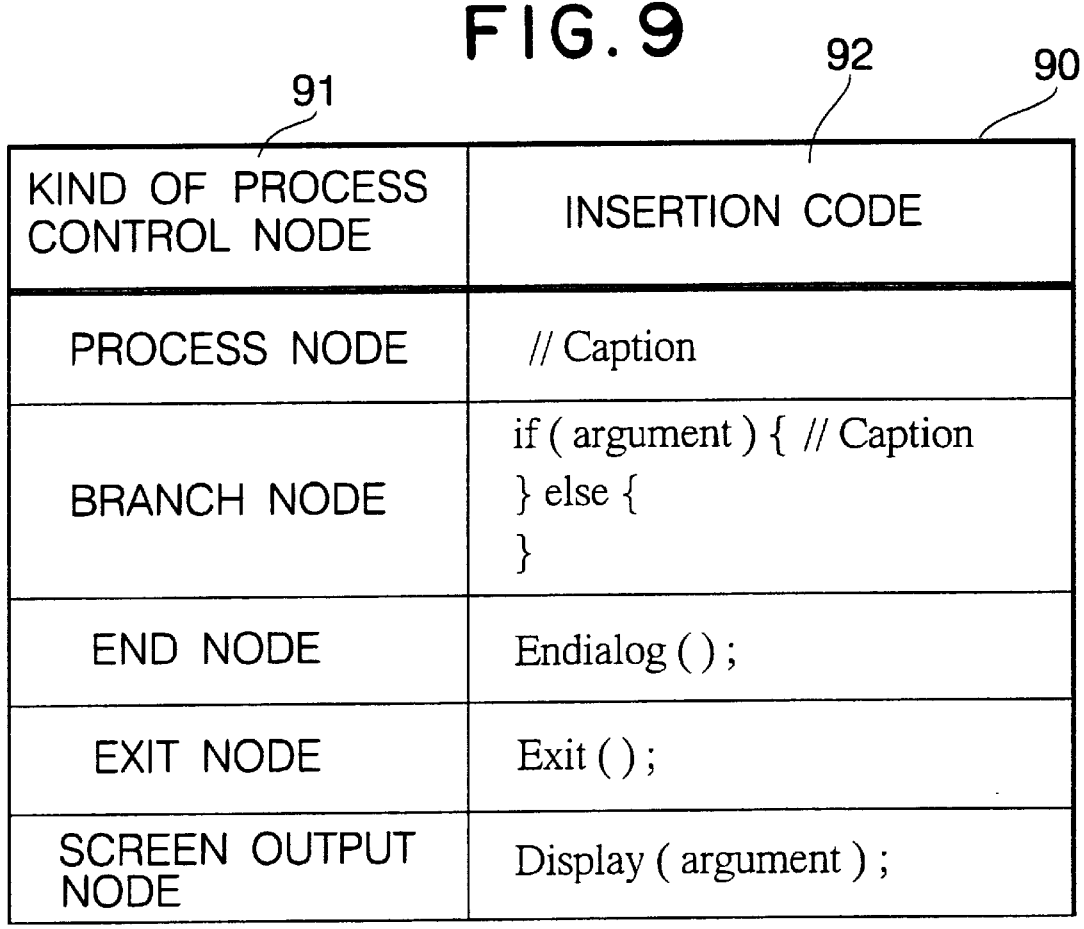
FIG. 9 is a view showing an example of programming language tables.

The contents of the program codes for each of the screens can be specified in the screen flow by linking the program parts contained in the screen node to the other screen nodes and to the node elements indicating the control of the other processes or the like in the manner as described hereinabove. As a result, the program codes to be created for each screen can be automatically created on the basis of the information about the screen flow registered in the screen flow control table 20. FIGS. 6A and 6B each show the contents of the program codes automatically created for the screen nodes 51 and 52, respectively. Although the programming languages to be used therein are virtual ones, the methods for representing the functions of the programming languages and for representing IF statements are the same as represented by C language. For example, "Exit ( );" in a program code 61 corresponding to Button A 51a or "Endialog ( );" in a program code 63 corresponding to Button C indicates the function for the termination of the program or the function for the disappearing of the screen, respectively. The programming languages to be employed in the visual program created are specified in advance by the programmer and recognized by the program creating tools. The automatic creation of the program codes can be performed by the program creating tools using a programming languages table 90 as shown in FIG. 9.

Next, a description will be made of the programming languages table. FIG. 9 shows an example of a programming languages table. As shown in FIG. 9, the programming languages table 90 is registered with a program code for a particular programming language as an insertion code field 92 corresponding to a kind of process control node field 91. The programming languages table is provided so as to correspond to one programming language to be employed by the programmer. The example of the programming languages table as shown in FIG. 9 corresponds to the programming languages used in FIGS. 6A and 6B. In the programming languages table, the kind of process control node field 91 is registered with the kind of the control node for the process relating to the program process on the screen flow. In correspondence thereto, the insertion code field 92 is registered with the program code corresponding to the control node for the process relating to each of the program processes.

Now, a description will be made of the procedure of automatically creating the program codes 61 and 62 of the program parts from the screen node 51 as shown in FIG. 6A with reference to FIGS. 5 and 9. As shown in FIG. 5, the Button A 51*a* in the screen node 51 ends the program by performing the event onto the Button A from the screen flow (FIG. 5). The event to be performed onto the Button A of the screen node 51 and the event to be performed onto the other button in the screen node 51 or the screen node 52 may include various actions, for example, such as "a click", "a double click" or "a right-button-click". The following description will be made by taking, as an example, the case where a programmer specifies the event to be performed as a "click" at the time of creating the screen flow.

The technique for creating the function to be called by a particular event to be performed onto a program part on the screen of the visual program in the manner as described hereinabove is the same as the existing visual programming technique.

As a statement in the function to be called at the time when the Button A 51*a* in the screen node 51 is clicked, a statement defined by "Exit ( ):" is inserted as indicated in the program code 61. This is done because the statement "Exit ( );" is in advance set by the programming languages table 90 so as to be inserted as its insertion code for the exit node.

Likewise, Button B 51*b* in the screen node 51 as shown in FIG. 6A inserts the code for generating the screen node 52 because a link is formed from the Button B 51*b* to the screen node 52 as indicated in the screen flow of FIG. 5. In this case, the insertion code for the node generating the screen is constituted as a "Display (argument)" statement by the programming languages table 90 as shown in FIG. 9. The word "argument" is an expression for specifying which screen to generate, and the screen node identifier to be specified by the argument is an identifier to be assigned at the time when each screen is created by the existing visual programming technique. This is recognized at the time when the screen flow creating editor is activated and each screen is displayed in a compressed manner as screen flow. The code as shown in FIG. 6A can be automatically created in the manner as described hereinabove.

A description will be likewise made of the procedure of automatically creating the program codes 63, 64 and 65 to be associated with the program parts from the screen node 52 as shown in FIG. 6B with reference to FIGS. 5 and 9. As Button C 52*a* in the screen node 52 is linked to the end node for causing the screen itself to disappear, clicking the Button C in the screen node 52 inserts a statement in the function to be called at the time of clicking as a statement "Endialog ( );" as indicated in the program code 63. This is because the insertion code for the end node is identified as the statement "Endialog ( );" by the programming languages table 90.

Further, Button D 52*b* in the screen node 52 is linked to the screen node 53 by the corresponding screen flow (FIG. 5). This is applied to the Button B 51*b* of FIG. 6A. Therefore, the "Display (argument)" statement is inserted into the program code 64 of FIG. 6B. Button E 52*c* in the screen node 52 is linked to branch node 56 by the corresponding screen flow (FIG. 5). Further, an insertion code for the branch node is constituted as a statement "if (argument) {//Caption} else {}" by the programming languages table 90 and a statement "if (1) {//Branch1 Display (Screen 3);} else {}" is inserted herein as the program code 65.

Although the condition for branch at this time is specified as "1", a programmer may enter a condition for branch later by manual work. In usual cases, the default value is determined at the time of automatically creating a code, thereby allowing the process to proceed in either direction without selecting anything at all by the programmer. In an example as indicated in the program code 65 as shown in FIG. 6B, a value is set as "1", thereby allowing compiling or performing another action by only the automatically created code without any action performed by the programmer.

Further, "//Caption" indicates that the characters written in the branch node 56 therein is inserted automatically as a comment in the screen flow. In addition, in the process by the branch node, the contents of the process vary with conditions. In other words, the screen node 53 is generated when the result of branch is "Yes" and the end node 58 is executed after the process node 57 has been carried out when the result of branch is "No". The code relating to the generation of the screen node 53 herein is the same as the program code 64 relating to the Button D 52*b*. This code is inserted into the program code 65, on the one hand, as a code when the condition for branch of the code relating to the above branch is "Yes". On the other hand, as a code when the condition for branch of the code relating to the above branch is "No", the process code 57 is inserted, followed by inserting a code relating to the end node 58 for carrying out the process for disappearing the screen. The codes relating to these processes are indicated as "//Caption" and "Endialog ( );", respectively, by the programming languages table 90.

The symbol "//" of the former means a comment and a user is requested to write an optional process. Into the character string "Caption" therein, the characters (caption) written in the process node 57 on the screen flow of FIG. 5 are inserted automatically. Further, as the end node 58, a code similar to the program code 63 for the Button C 52*a* is inserted. In addition, a variety of program codes other than those as described hereinabove may be employed for the program code for the branch. For example, they may include an "if ( ) {} else" sentence, an "if ( ) {} else if ( ) else {}" sentence, a "switch" sentence and so on, when represented by C language. They can be made easier to use by increasing the kind of the branch nodes to become suitable for the objective code.

Figure 7:
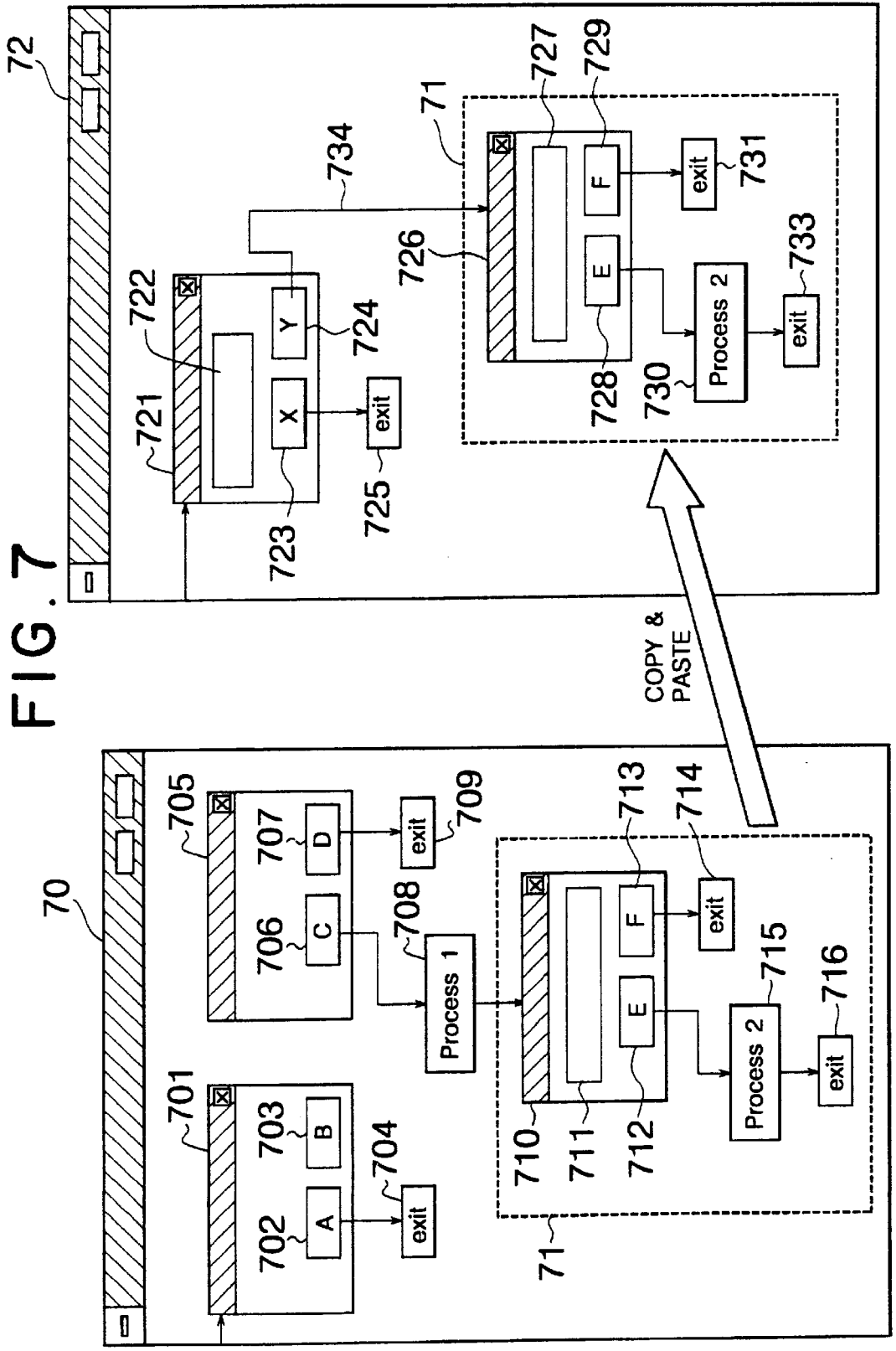
FIG. 7 is a view showing an example of operations for executing an edit operation of program codes by an edit operation of the screen flow.

A portion of the program code for each screen can be created automatically using screen flow in the manner as described hereinabove. This can promote an efficient work for creating the visual program. Further, a portion of the screen flow can also be reused. FIG. 7 shows an example in which a portion of the screen flow of an existing visual program is reused for a visual program to be created newly by the operation of editing the screen flow.

Now, a description will be made of the way of reusing the screen flow with reference to FIG. 7. An existing screen flow having a portion 71 sought to be reused is displayed on the edit window screen 70 as shown in FIG. 7 by activating the screen flow creating editor. The reusing portion is specified by the screen flow and copied, followed by activation of the screen flow creating editor and displaying a screen flow to be created newly on an edit screen 72. The necessary portion is then pasted. The operations for copying and pasting are the same as conventional operations for editing the screen.

The internal data configuration in this case will be described in this way. A portion corresponding to the screen flow of the reusing portion 71 sought to be reused is copied in the screen flow control table relating to the screen flow corresponding to the edit window 72 from the screen flow control table relating to the screen flow corresponding to the edit window 70, thereby automatically changing the identifiers, file names and so on in the screen flow control table necessary for the screen flow to be newly created in the edit window 72.

The changes of data of the screen flow control table at this time are indicated in FIGS. 10A and 10B. A description will be made of the changes of the screen flow control table at the time of implementing the copying operation in FIG. 7 with reference to FIGS. 10A and 10B each. FIGS. 10A and 10B show a portion of the screen flow control table corresponding to the screen flows of the edit windows 70 and 72 as shown in FIG. 7, respectively.

In the edit window 70, information of the screen flow control table indicated in screen flow 71 therein corresponds to a portion indicated in a node element record group 131 of a screen flow control table 120 of FIG. 10A and the portion indicated in the node element record group 131 is copied as internal data by the operation of copying the screen flow. Thereafter, in the edit window 72 of FIG. 7, the operation of pasting the portion of the screen flow 71 is carried out, thereby copying the portion indicated in the node element record group 131 in the screen flow control table corresponding to the edit window 72 and further changing the identifier, file name and so on, adding them as the portion to be indicated in a node element record group 132.

The reason for the necessity of changing the identifier, file name and so on is, for example, because the case may be considered to occur that the identifier, file name and so on which has been used before a screen node 721 of the screen flow shown in the edit window 72 of FIG. 7 overlaps with those as have been used before copying. However, the information added to the screen flow control table after copying retains its relative relationships with each of the program parts, nodes and so on before copying. At the end, in the edit window 72 of FIG. 7, a link is constructed to a screen node 726 from Button Y 724 in the screen node 721, thereby automatically adding information of this link 734 to a screen flow control table 140 as a link record 133.

By reusing a portion of the screen flow in the manner as described hereinabove, it is possible to reuse not only the program parts in each of the screens, but also a comprehensive process unit group in the screen flow. In addition, a node written to correspond to the node relating to the process control in the screen flow can also be copied after making a search from the screen flow before copying.

The way of reusing the screen flow may be further extended to register a portion of the reusing screen flow as a macro. This allows the portion of the screen flow to be reused from the registered macro without displaying the screen flow to be reused whenever it is reused. This technique can be performed conveniently without displaying the screen flow particularly when it is reused frequently.

Figure 8:
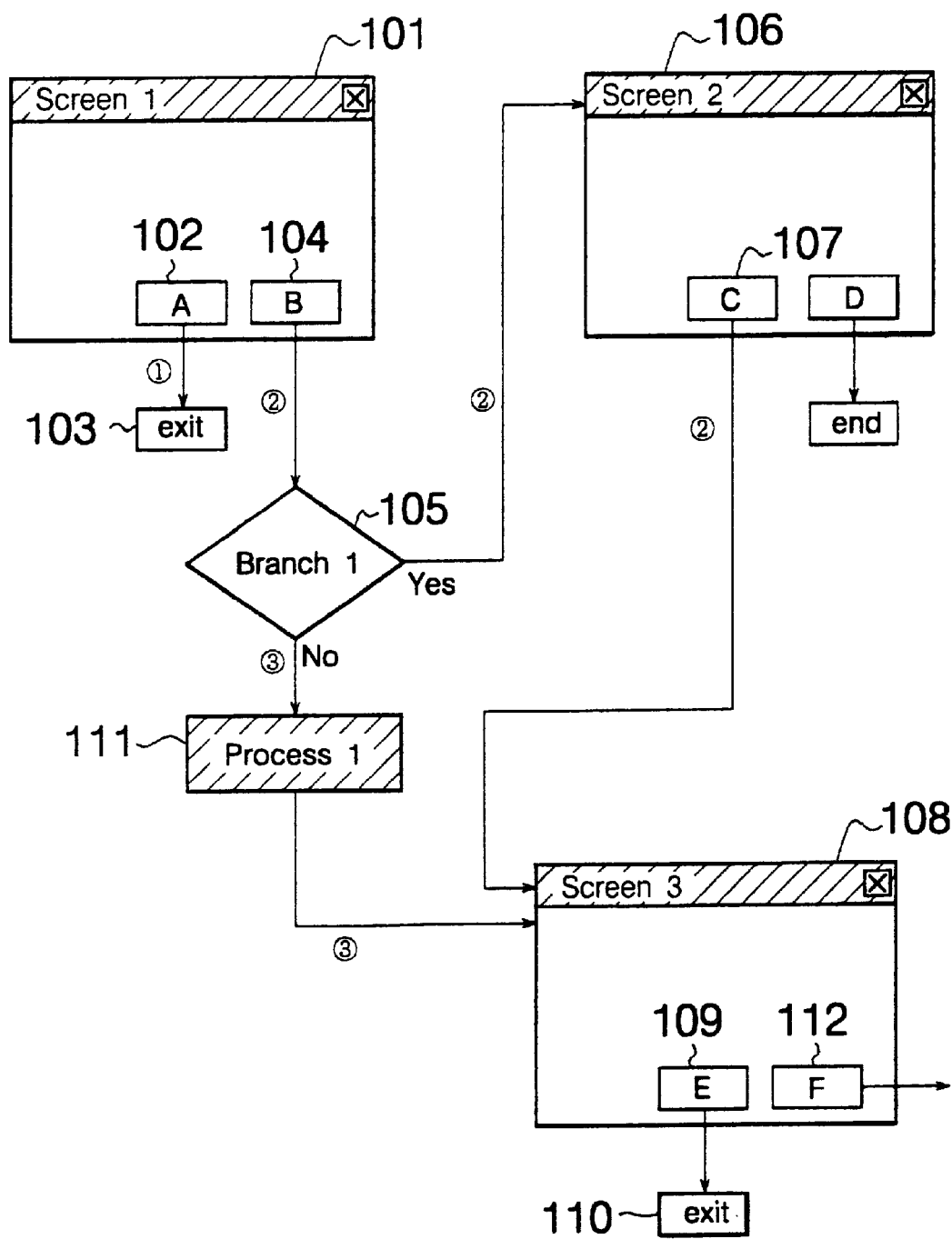
FIG. 8 is a view showing an example of a test case to be created on the basis of the screen flow.

Using the screen flow to be employed for this invention, a test case can be created automatically for a visual program created thereby, or debugging can be performed easily. FIG. 8 shows an example of creating a test case by screen flow and an example of making debugging easier. In FIG. 8, reference symbols ①, ② and ③ correspond, respectively, to Test Cases 1, 2 and 3 created automatically. A description will be made of such test cases.

Test case 1 is the case where the visual program is terminated by clicking Button A 102 in the screen node 101.

Test case 2 is the case where clicking Button B 104 in the screen node 101 produces "Yes" in Branch node 105, generating the screen node 106, clicking Button C 107 in the screen node 106 generates the screen node 108, and clicking Button E 109 in the screen node 108 lets the screen disappear.

Test case 3 is the case where clicking the Button B 104 in the screen node 101 produces "No" in the Branch node 105 executing Process node 111, generating the screen node 109 and then clicking Button F 112 of the screen node 108.

These test cases can be easily created by following the screen flow starting with the screen node first displayed on the screen flow using the screen flow control table.

Further, after these test cases have been created, the process can be executed step by step along a path of each of these test cases to debug the visual program, using the screen flow. As shown in FIG. 8, it is confirmed whether the screen flow proceeds as required by the specification by displaying the screen flow corresponding to the visual program and further displaying the positions and so on of the nodes of the corresponding process steps on the screen flow.

FIG. 8 shows the status when the program stops at the Process node 111. As the appearance of the display of the Process node 111 changes at this time, it can be visually recognized that the process of the program has proceeded to this stage. The technique of displaying the position of the source code corresponding to the step-by-step execution of the program has been established by the existing visual programming technique. It is thus apparent to display the position of the screen flow to which the source code corresponds, because the screen flow can automatically create the source code of the program. The program can be executed step by step by retrieving, executing and stopping a statement from the execution file of the program for each step of the program by activating the program execution control section 7 contained in the debugger. Further, the source code corresponding to the stopped process node can be seen by specifying the stopped process node. Thus, this can enhance debugging work efficiently.

Further, using the screen flow, it becomes easy to create the same visual program on the same operating system using a different programming language. For example, even when it is necessary to create a screen flow on a "Windows NT" operating system, to create a program with Visual C++, and then to create the same program using Visual Basic, the same screen flow can be employed. This can be performed simply by changing the kind of the language to be employed at the time of creating the code automatically. As the programming language table (FIG. 9) for Visual Basic is employed for the program creating tool in this operation, the codes to be automatically created are created with Visual Basic. In the prior art, when an existing visual program was to be created with a different language, the program had to be newly created again from the beginning. Thus, the conventional technique requires tremendous labor while the present invention using screen flow can much more easily be used to create the existing visual program with a different language.

The case where the same program has to be created again with a different programming language becomes significant more and more, for example, when the version of the programming language is, updated, when the version of the operating system is updated, or when maintenance of an existing program may become unstable in the future due to the lack of engineers capable of handling the existing programming language. This technique may be considered to become more significant because a version update of programming languages for recent PCs and for operating systems is made very frequently and it is not easy to always secure a sufficient number of skilled engineers who are well acquainted with new languages or new operating systems. In addition, this technique can offer a great advantage when the creation of a program is taken into account as a whole because the test case which has been created at the time when the existing program has been created can also be employed as it is.

Furthermore, using the existing screen flow, it is possible to create a source code of a program that can be operated on other operating systems. For example, when it is supposed that there is a program of Visual C++ language created using screen flow, which is executable on a "Windows NT" operating system, it is possible to create a source code of the same program of Tcl/Tk language, executable on a "UNIX" operating system, on the "Windows NT" operating system. Although the program itself created with the Tcl/Tk language has to be executable generally on the "UNIX" operating system, only the source code can be created by this technique. This technique is very advantageous because the program code or the test case for an expensive machine such as a Unix machine can be created, for example, with a cheaper development machine such as a PC machine.

Using the screen flow in the manner as described hereinabove, visual programs for various operating systems and for programming languages can readily be created. Further, it is also possible to readily create programs of different versions for the same operating systems and with the same programming languages.

Furthermore, the method of creating programs using screen flow in the manner as described hereinabove can also be applied to the case where a document descriptive language such as HTML (Hyper Text Markup Language) is to be created. Documents created with a typical HTML, such as home pages on the Internet, consist of multiple screens, buttons, texts and so on. To the texts themselves are linked other program parts. Such links can also be constituted by combinations or links of program parts, screen nodes, nodes relating to process control, and so on, like other program languages. It is thus possible to automatically create source codes and test cases using screen flow.

As described hereinabove, the apparatus for visual programming with screen flow can provide the features and advantages as will be described below by creating a program.

(1) Visual Recognition of Relationships Among Screens

Where multiple screens are required in a visual program, current technology cannot visually show the relationships among the multiple screens and it is cumbersome to create the program. Using the method of creating the program with screen flow, a programmer can visually see the relationships among the multiple screens.

(2) Visual Recognition of Program Flow

Using screen flow, a programmer can readily recognize the entire flow of a program, helping the programmer in understanding the program.

(3) Automatic Code Creating

Once a screen flow is created, a code can be automatically created which acting acts as a frame of the visual program, thereby preventing an occurrence of errors involved in the code acting as the frame of the program.

(4) Reusing a Portion of Screen Flow

By copying a portion of a screen flow, it can be reused for other programs or in its screen flow. This can greatly improve efficiency in creating visual programs.

(5) Use of Macro

By saving a portion of screen flow as a macro, it can also be reused later for other screen flow.

(6) Visual Debugging

In debugging, it is often required to repeat the actions of executing a program and stopping it. In this case, the position in current progress of the process can be indicated on the screen flow. This can improve efficiency in debugging.

(7) Automated Test Case Generation

Using a screen flow, it is possible to automatically create test cases of a program.

(8) Creating Program with Multiple Different programming languages

It is possible to readily create a visual program with multiple different programming languages using a one-screen flow. This technique can very easily change the programming language, for example, when the version of the programming language is to be updated, when the version of the operating system is to be updated, or when maintenance of the program has to be made with a programming language which cannot be expected to be handled well by well-experienced engineers due to the lack of such engineers. In such cases, the existing programming languages can be replaced by other programming languages that can be handled by many experienced engineers. Further, the first created test cases can also be used as they are.

(9) Development on Different Operating Systems

Using screen flow, it is possible to automatically create codes as long as a frame of the program is concerned, even if the operating system for creating the program is different from the operating system for executing the program. This allows programs and test cases for expensive machines to be created with cheaper developing machines, for example, PC machines.

What is claimed is:

1. An apparatus for visual programming for creating an application program having a visual user interface, comprising:

screen storage means for storing data of a plurality of screens to be employed with the application program;

screen creating means for creating the data of the plurality of screens to be employed with the application program and storing the data of the plurality of screens in said screen storage means;

screen flow creating means for creating a screen flow indicating a flow of processes, by displaying the data of the plurality of screens stored in said screen storage means in a compressed manner on an edit screen as compressed screens, specifying a link between each of the compressed screens and node elements on the edit screen, and displaying an arrow showing a direction of process flow between the compressed screens and node elements on the edit screen by the links;

screen flow information extracting means for extracting data of the links from said screen flow created by said screen flow creating means; and code creating means for creating a source code from the data of the links extracted by said screen flow information extracting means and from data of said screen, and for storing the source code in an execution file.

2. An apparatus for visual programming as claimed in claim 1, further comprising:

execution means for displaying a course for executing processes at positions corresponding to the screen flow on the edit screen by displaying the screen flow created by said screen flow creating means on the edit screen, and for executing the execution file.

3. An apparatus for visual programming as claimed in claim 1, further comprising:

a screen flow control table for registering the compressed screens to be employed with the application program;

wherein said screen flow control table contains the links between each of the registered compressed screens.

4. An apparatus for visual programming as claimed in claim 1, further comprising:

a screen flow control table for registering the compressed screens to be employed with the application program;

wherein the screen flow control table contains a link between a program part in each of the compressed screens registered therein and each of the compressed screens in said screen flow control table.

5. An apparatus for visual programming as claimed in claim 1, further comprising:

a screen flow control table for registering the compressed screens to be employed with the application program;

wherein the screen flow control table contains a link between an item in each of the compressed screens registered therein and each of the compressed screens in said screen flow control table.

6. An apparatus for visual programming as claimed in claim 1, wherein said screen flow creating means has a screen flow control table for registering the compressed screens to be employed with the application program; and wherein said screen flow control table registers attribute information of a link connecting a program part in each compressed screen registered therein to each of the compressed screens.

7. An apparatus for visual programming as claimed in claim 1, wherein said screen flow creating means has a screen flow control table for registering the compressed screens to be employed with the application program; and said screen flow control table registers attribute information of a screen node identifier of a compressed screen belonging thereto, a flow start node identifier, a file name, a function name, and a connection node identifier.

8. An apparatus for visual programming as claimed in claim 1, wherein said screen flow creating means displays a state in which a relationship of a position of a program part provided on each of said compressed screens is retained, when the compressed screens stored in said screen storage means are displayed on the edit screen in a compressed manner.

9. A programming method for creating an application program with a visual user interface, comprising:

first step of creating and storing data of a plurality of screens to be employed with the application program;

a second step of creating a screen flow indicating a flow of processes by displaying data of each of the plurality of screens stored in said screen storage means in a compressed manner on an edit screen as compressed screens, specifying a link between each of the plurality of compressed screens and node elements on the edit screen, and displaying an arrow showing a direction of process flow between the compressed screens and node elements on the edit screen by the links;

a third step of extracting data of the links from said screen flow; and a fourth step of creating a source code from the data of the links and from data of said compressed screens.

10. A programming method for creating an application program as claimed in claim 9, wherein in the second step, a relationship of a position of a program part provided on each of said compressed screens is retained, when the compressed screens stored in said screen storage means are displayed on the edit screen in a compressed manner.

* * * * *